US010689094B2

(12) United States Patent
Patsouris et al.

(10) Patent No.: US 10,689,094 B2
(45) Date of Patent: **\*Jun. 23, 2020**

(54) DEVICE FOR LOCKING THE PITCH AND FOR FEATHERING ADJUSTABLE-PITCH FAN BLADES OF A TURBINE ENGINE PROPELLER

(71) Applicant: SAFAN AIRCRAFT ENGINES, Paris (FR)

(72) Inventors: Emmanuel Pierre Dimitri Patsouris, Moissy-Cramayel (FR); Sebastien Emile Philippe Tajan, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 61 days.

This patent is subject to a terminal disclaimer.

(21) Appl. No.: 16/067,847

(22) PCT Filed: Jan. 4, 2017

(86) PCT No.: PCT/FR2017/050012
§ 371 (c)(1),
(2) Date: Jul. 3, 2018

(87) PCT Pub. No.: WO2017/118809
PCT Pub. Date: Jul. 13, 2017

(65) Prior Publication Data
US 2019/0009886 A1    Jan. 10, 2019

(30) Foreign Application Priority Data
Jan. 5, 2016 (FR) ..................... 16 50041

(51) Int. Cl.
*F04D 29/36* (2006.01)
*B64C 11/32* (2006.01)
*B64C 11/38* (2006.01)

(52) U.S. Cl.
CPC .......... *B64C 11/325* (2013.01); *B64C 11/385* (2013.01); *F04D 29/362* (2013.01); *Y02T 50/66* (2013.01)

(58) Field of Classification Search
None
See application file for complete search history.

(56) References Cited

U.S. PATENT DOCUMENTS 3,002,568 A * 10/1961 Bodem .................. B64C 11/34
416/45
3,003,566 A * 10/1961 Conn ..................... B64C 11/34
416/45

(Continued)

FOREIGN PATENT DOCUMENTS

WO    WO 2012/066240 A1    5/2012

OTHER PUBLICATIONS

International Search Report dated Mar. 24, 2017, in PCT/FR2017/050012, filed Jan. 4, 2017.

*Primary Examiner* — Michael Lebentritt
(74) *Attorney, Agent, or Firm* — Oblon, McClelland, Maier & Neustadt, L.L.P.

(57) ABSTRACT

A device for locking the pitch and for feathering adjustable-pitch fan blades of a turbine engine propeller, the device including an actuator having at least one movable portion designed to be coupled to pivots of the fan blades of the propeller in order to modify their pitch angle when it slides, a movable part having first mechanical device suitable for co-operating with the actuator when in a fan blade pitch-unlocking position in order to enable the actuator movable portion to slide over an extended actuator stroke; and second mechanical device suitable for co-operating with the actuator when in a fan blade pitch-locking position in order to enable the actuator movable portion to slide over an actuator (Continued)

stroke that is shorter than the extended actuator stroke, and an actuator.

13 Claims, 3 Drawing Sheets

(56) References Cited

U.S. PATENT DOCUMENTS

| | | | | |
|---|---|---|---|---|
| 3,057,410 | A | | 10/1962 | Biermann |
| 3,450,208 | A | * | 6/1969 | Barton ................. B64C 11/306 416/34 |
| 4,842,484 | A | * | 6/1989 | Johnson ............... B64C 11/306 415/130 |
| 5,213,471 | A | * | 5/1993 | Miller .................. B64C 11/325 416/129 |
| 5,286,166 | A | * | 2/1994 | Steward ................ B63H 3/008 416/136 |
| 5,470,204 | A | * | 11/1995 | Schafer ................. F03B 3/103 416/157 R |
| 5,685,694 | A | * | 11/1997 | Jones ....................... F01D 7/02 416/147 |
| 5,779,446 | A | * | 7/1998 | Althof ..................... F01D 7/00 416/162 |
| 2013/0224021 | A1 | | 8/2013 | Gallet |
| 2017/0218974 | A1 | * | 8/2017 | Grice ................... B64C 11/385 |
| 2017/0233066 | A1 | * | 8/2017 | Bredenbeck, Jr. ...... B64C 11/30 244/230 |
| 2017/0267329 | A1 | * | 9/2017 | Lassalle ............... B64C 11/301 |
| 2017/0313406 | A1 | * | 11/2017 | Lassalle ................ B64C 11/40 |
| 2018/0057146 | A1 | * | 3/2018 | Futa, Jr. ................ B64C 11/38 |
| 2019/0009887 | A1 | * | 1/2019 | Yvon .................... B64C 11/385 |
| 2019/0031319 | A1 | * | 1/2019 | Calkins ................ B64C 11/303 |
| 2019/0031360 | A1 | * | 1/2019 | Ettorre .................. B64D 27/10 |

* cited by examiner

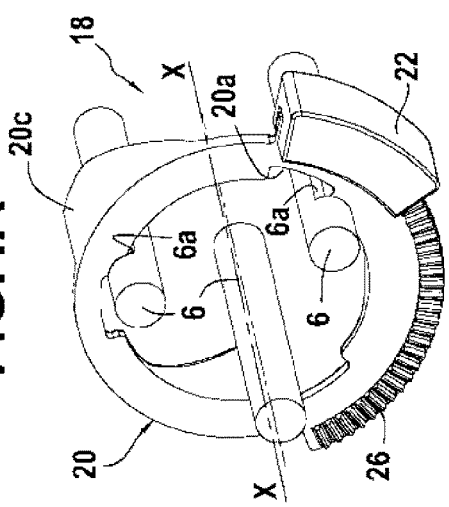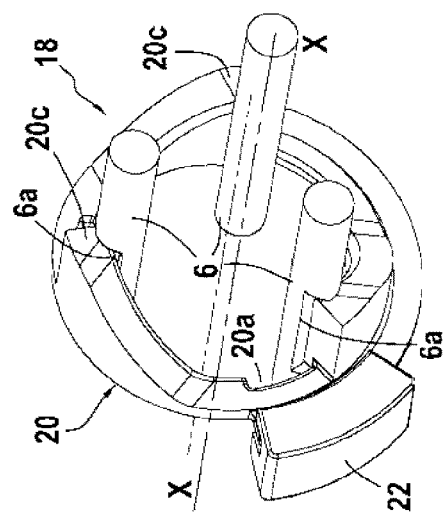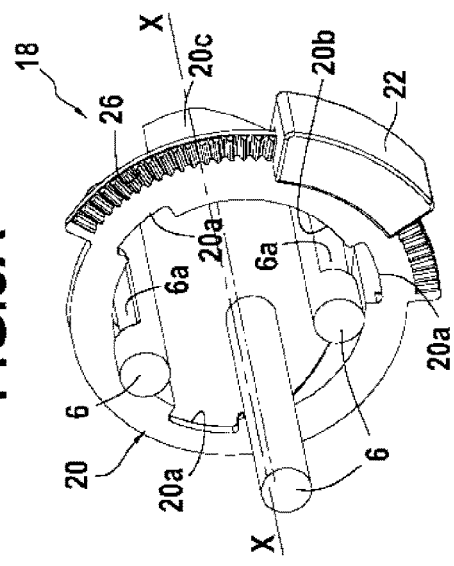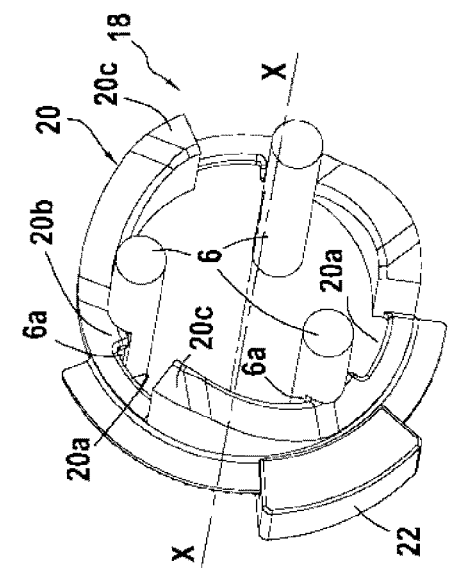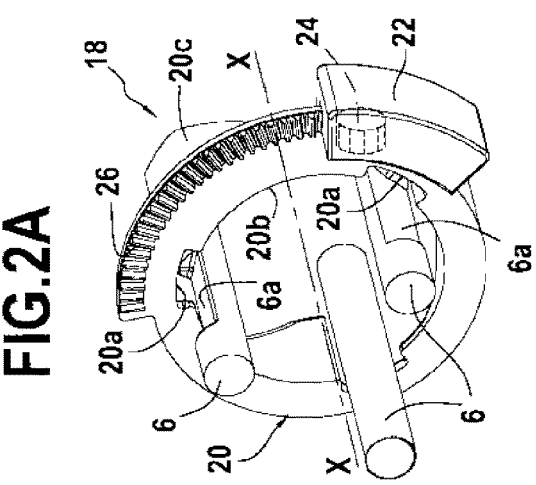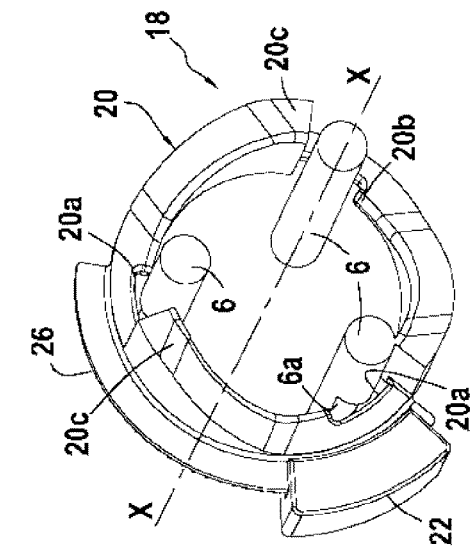

DEVICE FOR LOCKING THE PITCH AND FOR FEATHERING ADJUSTABLE-PITCH FAN BLADES OF A TURBINE ENGINE PROPELLER

BACKGROUND OF THE INVENTION

The present invention relates to the general field of turbine engines having one or two optionally ducted fans, and more particularly to controlling the pitch of the fan blades in such turbine engines.

A preferred field of application of the invention lies with turbojets having contrarotating propellers, also known as "open rotors", comprising two contrarotating propellers, placed downstream (in a "pusher" configuration) or upstream (in a "puller" configuration) of the gas generator. Nevertheless, the invention also applies to turboprops having one or more propulsive propellers.

In a turbojet with one or more propellers, it is known that the pitch (or orientation) of the blades constituting such propellers constitutes one of the parameters enabling the thrust of the turbojet to be managed, in particular by causing the propeller to operate always under the best possible conditions. Specifically, the speed of the propellers is also constant during all stages of flight, and it is the pitch of the propeller blades that serves to vary thrust. Thus, during a stage of cruising flight, it is desired to obtain the lowest possible power on the turbine shaft that is compatible with given traction at a given airplane speed, so as to obtain the best efficiency (i.e. the efficiency that serves to minimize fuel consumption and increase range). Conversely, on take-off, the highest possible traction is sought in order to cause the airplane to accelerate and then take off.

Varying the pitch of propeller blades requires certain safety measures to be taken in order to ensure that the blades do not remain blocked in certain positions, in particular as a result of a malfunction of the systems for controlling their pitch. For example, under their own centrifugal effect, the blades tend to take up a flat pitch position that corresponds to a pitch in which their chords make an angle of 90° with the axis of rotation of the propeller. However, a blade blocked in this flat position generates little resistive torque and runs the risk of overspeeding, with the resulting danger of losing a blade and/or the rotary hub carrying it. A blade blocked in this position also runs the risk of generating drag that is excessive and unacceptable for the airplane. Likewise, in flight, moving into a reverse thrust mode (corresponding to a pitch for which the chords of the blades form an angle of 120° with the axis of rotation of the propeller) as a result of a failure of the blade pitch control system, presents the risk of making the aircraft uncontrollable and causing it to drop.

It is thus known to seek to limit the angular positions of propeller blades so that: they do not take up a reverse thrust mode or a flat position while in flight; they do not remain in the flat position while the aircraft is on the ground and the engine is running; and they can occupy all allowable positions when the propellers are not rotating. Furthermore, in the event of a failure of the blade pitch control system, the blades should be capable of taking up a "feathered" position, i.e. a pitch in which their chords are aligned with the axis of rotation of the propeller, thereby reducing the drag that they generate and generating sufficient resistive torque to prevent overspeeding.

In the context of the present invention, these constraints on limiting the angular positions of and on feathering the blades of propellers need to be incorporated in a blade pitch control system of the type comprising an axial annular actuator situated in a reference frame that is stationary relative to the structures of the engine.

Unfortunately, with that type of control, known devices for locking pitch and feathering propeller blades present numerous drawbacks. By way of example, mention may be made of heavy systems using counterweights that generate centrifugal force enabling blades to be feathered, as described in publications WO 2012/066240 and FR 2 957 329.

OBJECT AND SUMMARY OF THE INVENTION

A main object of the present invention is thus to propose a device for locking the pitch and for feathering adjustable-pitch fan blades of a propeller of a turbine engine (having a ducted fan or an unducted fan) while not presenting the above-mentioned drawbacks.

In accordance with the invention, this object is achieved by a device for locking the pitch and for feathering adjustable-pitch fan blades of a turbine engine propeller, the device comprising:

an actuator having at least one actuator movable portion extending parallel to an axis of rotation of the propeller and designed to be coupled to pivots of the fan blades of the propeller in order to modify their pitch angle when it slides;

a movable part that is movable relative to the actuator having first mechanical means suitable for co-operating with the actuator when in a fan blade pitch-unlocking position in order to enable the actuator movable portion to slide over an extended actuator stroke; and second mechanical means distinct from the first mechanical means and suitable for co-operating with the actuator when in a fan blade pitch-locking position in order to enable the actuator movable portion to slide over an actuator stroke that is shorter than the extended actuator stroke; and drive means for moving the movable part between the unlocking position of the actuator and the locking position of the actuator.

In an embodiment, the movable part may be a ring centered on the axis of rotation of the propeller, and the first mechanical means may be configured to co-operate with the actuator in the fan blade pitch-unlocking position to allow the actuator movable portion to slide along an extended actuator stroke, the second mechanical means may be angularly offset relative to the first mechanical means and may be configured to co-operate with the actuator when in the fan blade pitch-locking position to allow the actuator movable portion to slide over an actuator stroke that is shorter than the extended actuator stroke, and the drive means may comprise means for causing the ring to pivot about the axis of rotation of the propeller.

The term "fan blades" is used herein to cover both the blades of a propeller (for an unducted fan turbine engine) and the blades of a fan (for a ducted fan turbine engine).

Depending on the angular position of the ring, the stroke of the actuator varies (between an extended stroke and a shorter stroke). By acting mechanically on the actuator in this way, the device of the invention serves to limit the pitch angle ranges available to the propeller blades while in flight. This purely mechanical device is reliable, irreversible (i.e. the blades cannot move the device), simple to implement, and provides a significant saving in weight compared with devices that make use of counterweights. Furthermore, the device uses a source of energy for powering the means that cause the ring to pivot about the axis of rotation of the propeller that is independent from the source of energy used by the system for controlling the pitch of the blades, thereby providing an additional degree of reliability. Such a device is also well adapted to control systems that need to be compact radially.

The actuator moving portion may include a flat and the first mechanical means of the movable part may include a notch formed in a portion facing the movable portion of the actuator, such as the inner periphery of the ring when the movable part is a ring, and along which the flat of the movable portion of the actuator can slide when in the fan blade pitch-unlocking position. Likewise, the second mechanical means of the movable part may include an abutment against which the flat of the movable portion of the actuator comes into abutment when in the fan blade pitch-locking position.

Under such circumstances, the device acts as a sequential mechanism in which the movable part can be moved only as a function of the position of the actuator movable portion, and the actuator movable portion can be moved only as a function of the position of the movable part.

Preferably, the movable part further comprises third mechanical means distinct, i.e., for a ring, means that are angularly offset, from the first and second mechanical means and suitable for co-operating with the actuator to move it into a fan blade feathered position (in particular in the event of a failure of their pitch control).

Under such circumstances, the third mechanical means of the movable part may include a ramp projecting from a lateral surface of said movable part and forming a cam path along which the flat of the movable portion may slide in order to bring the actuator movable portion into the fan blade feathered position. The device is thus irreversible in the sense that the orientation of the ramp can vary the pitch of the blades (in order to feather them), but the pitch of the blades cannot vary the orientation of the ramp, which present a friction angle that is too great relative to the actuator movable portion.

As a result, the movable part of the device acts like a latch: the actuator movable portion may be movable or not movable as a function of the position of the movable part, i.e. as a function of the angular position of the ring when the movable part is a ring. Conversely, the movable part may be movable or not movable as a function of the position of the movable portion of the actuator.

The means for causing the ring to pivot about the axis of rotation of the propeller may comprise drive means having a gearwheel meshing with teeth carried by the ring. Under such circumstances, the teeth of the ring may be positioned at an outer periphery of the ring and may extend angularly over a portion of said ring.

The movable portions of the actuator may be positioned inside the ring. The extended actuator stroke preferably corresponds substantially to the stroke allowed to the actuator in flight. The device may include at least three movable actuator portions regularly distributed around the axis of rotation of the propeller.

The invention also provides a system for controlling the pitch of fan blades of a turbine engine having at least one propeller with adjustable-pitch fan blades, said propeller being constrained to rotate with a rotary ring, the fan blades being coupled, in order to adjust their pitch, to a system comprising an actuator and a load transfer bearing, the system further comprising a device as defined above for locking the pitch of the blades and for feathering them.

The invention also provides a turbine engine including at least one set of adjustable-pitch fan blades and such a fan blade pitch coupling system.

BRIEF DESCRIPTION OF THE DRAWINGS

Other characteristics and advantages of the present invention appear from the following description made with reference to the accompanying drawings which show an embodiment having no limiting character. In the figures:

FIGS. 2A and 2B are diagrammatic views in two opposite directions showing the device of the first embodiment of the invention in its pitch unlocking position;

FIGS. 3A and 3B are diagrammatic views in two opposite directions showing the device of the first embodiment of the invention in its pitch locking position;

FIGS. 4A and 4B are diagrammatic views in two opposite directions of the device of the first embodiment of the invention in its feathered position.

DETAILED DESCRIPTION OF THE INVENTION

The invention applies to any turbine engine having at least one ducted or unducted fan, and in which the propeller blades (for an unducted fan) or the fan blades (for a ducted fan) are fitted with a pitch-changer system.

The invention applies in particular to turboprops having one or more propulsive propellers, and also to open rotor turbojets that have either one propeller (and a variable pitch stator for an unducted single fan (USF)), or else two contrarotating propellers, that may be located upstream (in a "puller" configuration) or downstream (in a "pusher" configuration) of the gas generator. The invention also applies to ducted-fan turbine engines.

The architecture of these types of turbine engine is well known to the person skilled in the art and it is not described in greater detail herein. Briefly, such turbine engines have one or more propellers (for an unducted fan engine) or a fan (for a ducted fan engine) each made up of a set of variable pitch fan blades, i.e. blades of orientation that can be modified by means of a system for controlling blade pitch, as described below.

In the description below, the terms "propeller" and "propeller blade" are used interchangeably since the invention applies to an unducted fan engine or to a ducted fan engine (in which the propeller corresponds to the fan and the propeller blades to the fan blades).

A turbine engine propeller is made up of a set of optionally independent variable pitch fan blades, i.e. blades of orientation that can be modified by means of a blade pitch control system.

Figure 1:
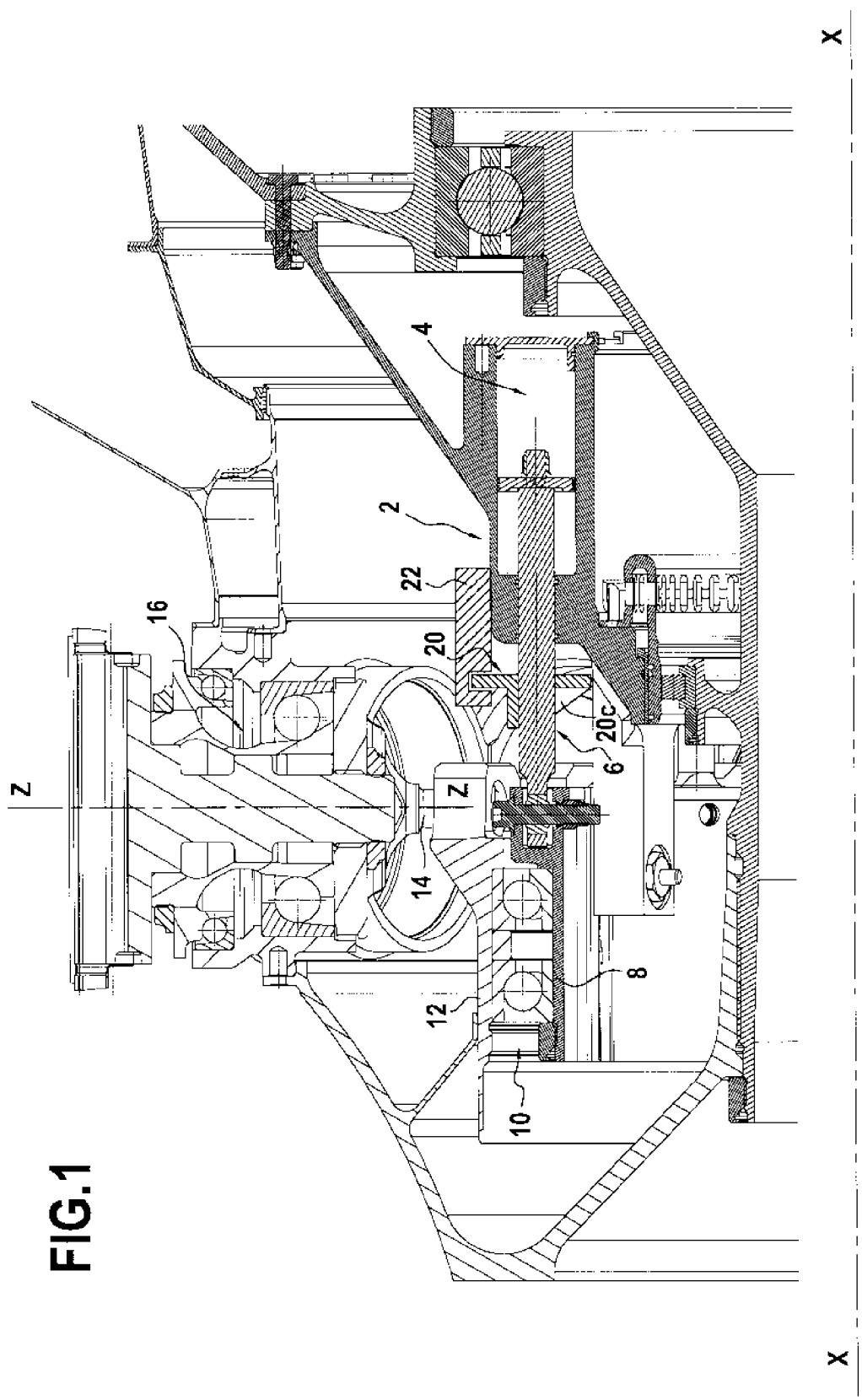
FIG. 1 is a section view showing an example installation of a device in a first embodiment of the invention.

As shown in FIG. 1, the control system may comprise an axial actuator 2 centered on the axis of rotation X-X of the propeller and stationary relative to the structures of the engine (the axis of rotation of the propeller generally coincides with the axis of the turbine engine but it might be offset in certain configurations).

The actuator 2 has a chamber 4 (i.e. stationary portion) and rods 6 (i.e. movable portions) that can move axially in synchronized manner when the actuator is actuated. At their free ends, the rods 6 are connected to the inner ring 8 of a load transfer rolling bearing 10 having its outer ring 12 coupled via a lever arm 14 to pivots 16 of the fan blades of the propeller mounted on a rotary ring 17 that is centered on the axis X-X). Thus, when the actuator 2 is actuated, the rods 6 move in translation to move the load transfer rolling bearing 10, thereby causing the pivots 16 of the fan blades to pivot about their radial axes Z-Z and thus change their pitch. In a variant embodiment that is not shown, it is the cylinder of the actuator that is movable (i.e. the movable portion) in translation relative to the actuator rods, which are stationary (i.e. the stationary portion).

In the invention, a device is provided that enables the pitch of fan blades to be locked, and that enables them to be feathered, in the event of a failure of their pitch control system.

FIGS. 2A-2B, 3A-3B, and 4A-4B show a first embodiment of such a device 18 in different operating configurations.

As shown in these figures, the device of the first embodiment of the invention comprises a ring 20 centered on the axis of rotation X-X of the propeller together with means for causing the ring to pivot about the axis X-X. In contrast, the ring is stationary axially.

The ring 20 is for co-operating with the rods 6 of the axial actuator, there being three such rods in this example, which are regularly distributed around the axis X-X. More precisely, the ring is positioned in a plane extending transversely to the propeller axis X-X so as to surround the rods 6 of the actuator. These rods are thus located inside the ring.

Furthermore, when they are in their positions retracted into the actuator chamber, i.e. as far downstream as possible, the rods project out from the chamber by a length that is at least greater than the stroke of the actuator. The stroke of the actuator enables the controlled blades to be taken from a feathered position to a pitch position having the largest angle that they can encounter in flight.

Each rod 6 includes a flat 6a that is machined in an intermediate portion of the rod lying outside the actuator chamber. The flat 6a extends axially over a length that corresponds substantially to the allowable stroke of the actuator while in flight.

These flats 6a of the rods are for co-operating with various mechanical means formed at the inner periphery of the ring 20.

Thus, when the device is in its position for unlocking the pitch of the fan blades, the flats co-operate with notches 20a formed in the inner periphery of the ring 20.

FIGS. 2A and 2B (an upstream view for FIG. 2A and a downstream view for FIG. 2B) show the device when it is in such a fan blade pitch-unlocking position, i.e. a position in which it allows the actuator of the blade pitch control system to go from one blade pitch angle to another. For this purpose, in this unlocking position, when the actuator is actuated, the flats 6a of the rods 6 can slide freely along the notches 20a in the ring 20 (along the axis X-X) so as to modify the pitch of the blades.

The ring 20 of the device of the invention also has abutments 20b that are directly adjacent to the notches 20a, and each of which is suitable for co-operating with a flat 6a of a rod 6 of the actuator when the device is in its fan blade pitch-locking position (FIGS. 3A and 3B).

More precisely, these abutments 20b may be in the form of crenellations constituting abutments that present the flats 6a of the rods from sliding along their full length. Preferably, the shoulders of the flats come mechanically into abutment against these crenellations.

FIGS. 3A and 3B (an upstream view for FIG. 3A and a downstream view for FIG. 3B) show the device when the ring 20 is pivoted so as to occupy its fan blade pitch-locking position. In this position, the device limits the stroke of the actuator of the blade pitch control system so as to prevent the rods from occupying unauthorized pitch angle positions while in flight. The unauthorized pitch angle positions are in particular the thrust reversal position and other pitch angle positions that lead to excessive drag.

In other words, in this locking position, when the actuator is actuated, the flats 6a of the rods 6 can slide so as to modify the pitch of the blades along the notches 20a of the ring 20 (along the axis X-X) but over a stroke that is limited in comparison with the unlocking position of FIGS. 2A and 2B.

The ring 20 of the device of the invention also includes ramps 20c forming cam paths that are angularly interposed between the notches 20a and the abutments 20b and that are suitable for co-operating with the flats 6a of the rods 6 of the actuator when the device is in its fan blade feathered position (FIGS. 4A and 4B).

By way of example, these ramps 20c are in the form of protuberances projecting from a lateral face of the ring 20 (in FIGS. 4A and 4B they project from the downstream side of the ring). When the flats 6a of the rods 6 of the actuator slide along these ramps 20c, they take up a position in which they prevent any axial movement of the rods. This position advantageously corresponds to the feathered position of the fan blades (the blades have their chords in alignment with the axis of rotation of the propeller).

FIGS. 4A and 4B (an upstream view for FIG. 4A and a downstream view for FIG. 4B) thus show the device when the ring is angularly pivoted so as to occupy its fan blade feathered position. When the ring is pivoted into this position, the rods of the actuator are moved axially in translation (the shoulders of their flats coming into abutment against the ramps and following the cam paths formed by the ramps), thereby bringing the blades into the feathered position.

In this feathered position, it should be observed that contact between the rods and the ring takes up the return forces to which the blades are subjected, thereby giving rise to excessive stress at the points of contact. Thus, one of the ends of the flats in the rods is advantageously shaped to match the shape of the ramp of the ring, in order to increase the area of contact between the flat and the ramp.

There follows a description of an embodiment of means for enabling the ring 20 to pivot about the axis of rotation of the propeller in order to put the device into any one of its above-described positions (its blade pitch-unlocking position, its blade pitch-locking position, and its blade feathered position).

In the embodiment shown in FIGS. 2A-2B, 3A-3B, and 4A-4B, these means comprise drive means 22, e.g. an electric actuator, that have a gearwheel 24 meshing with teeth 26 carried by the ring 20.

More precisely, the teeth 26 are positioned at an outer periphery of the ring 20 and they extend angularly over a portion of said ring.

Thus, a command serves to control the drive means 22 in order to pivot the ring 20 about the axis of rotation X-X of the propeller in order to select the position that is to be occupied by the device of the invention (blade pitch-unlocking position, blade pitch-locking position, and blade feathered position).

In the presently-described embodiment, the ring 20 co-operates with the actuator rods 6 (via their flats 6a). Naturally, it is possible to envisage a configuration in which the ring co-operates instead with the cylinder of the actuator (e.g. via a flat formed on the cylinder).

Figure 5A:
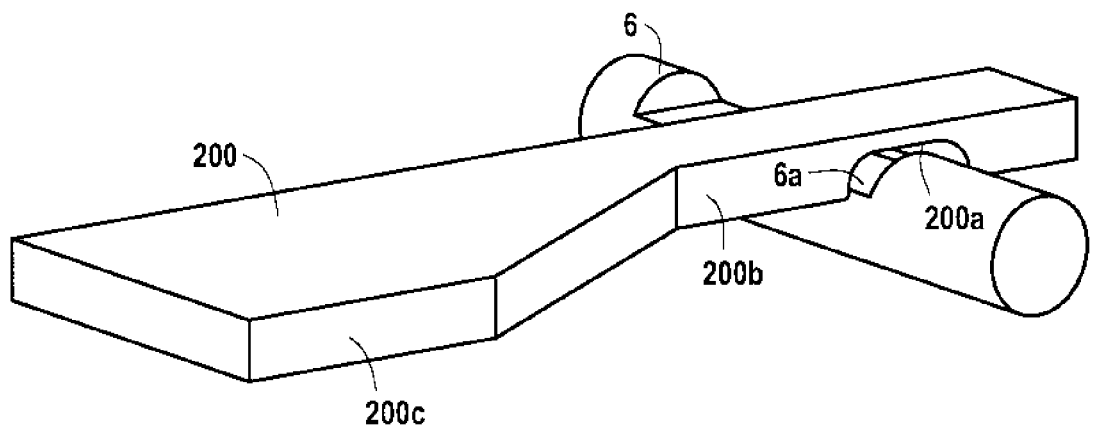
FIGS. 5A, 5B, and 5C are diagrammatic views of a device in a second embodiment of the invention respectively in its pitch unlocking position, its pitch locking position, and its feathered position.
Figure 5B:
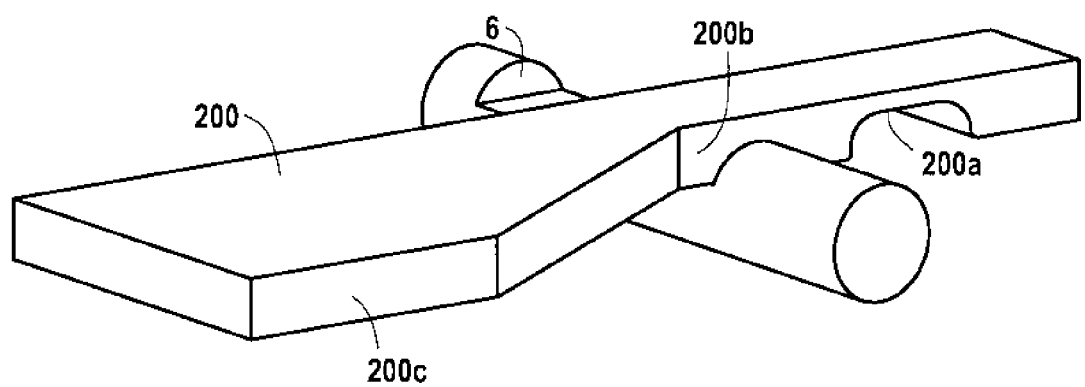
Figure 5C:
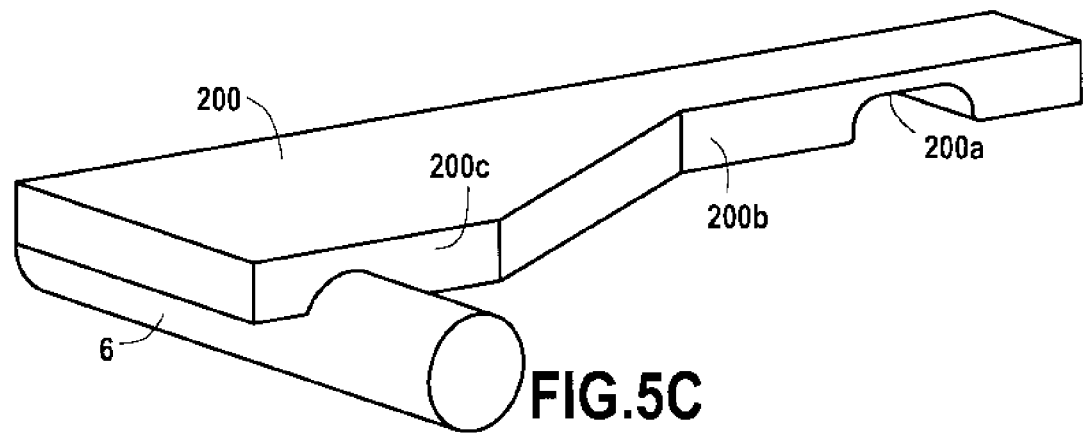

FIGS. 5A, 5B, and 5C show a second embodiment of such a device 18 in different operating configurations. More precisely, FIGS. 5A to 5C show the device 18 respectively in the pitch-unlocking position, the pitch-locking position, and the feathered position.

As shown in FIGS. 5A to 5C, the device in the second embodiment of the invention comprises both a cam 200 for each rod 6 of the actuator 2, which cam 200 moves in translation orthogonally relative to the rod 6 with which it is associated, and also means (not shown) for moving the cam 200 orthogonally relative to the rod 6 among three positions.

Furthermore, when in the retraced position, in the chamber 4 of the actuator 2, i.e. as far downstream as possible, the rods 6 project outside the chamber 4 over a length that is not less than the stroke of the actuator 2. The stroke of the actuator 2 serves to bring the controlled blades from a feathered position to a pitch position having the largest angle they can encounter in flight.

As in the first embodiment, each rod 6 has a flat 6a that is machined in the intermediate portion of the rod 6 outside the chamber 4 of the actuator 2. The flat 6a extends axially over a length that corresponds substantially to the stroke of the actuator 2 that is allowable in flight.

These flats 6a of the rods 6 are for co-operating with various mechanical means formed in a portion of the cam 200 facing the rod 6 with which it is associated.

Thus, when the device 18 is in its fan blade pitch-unlocking position, the flat 6a of a rod 6 co-operates with the notch 200a in the associated cam 200, the notch 200a being formed in a face of the cam 200 facing the rod 6.

FIG. 5A shows the device 18 while it is in such a fan blade pitch-unlocking position, i.e. when it allows the actuator 2 of the blade pitch control system to move the blades from one pitch angle to another. For this purpose, in this unlocking position, when the actuator 2 is actuated, the flat 6a of the rod 6 is free to slide along the notch 200a in the ring 200 (along the axis X-X) so as to modify the pitch of the blades.

Each cam 200 of the device 18 in the second embodiment of the invention also has an abutment 200b that is directly adjacent to the notch 200a and that is suitable for co-operating with the flat 6a of the rod 6 of the actuator 2 with which it is associated while the device 18 is in its fan blade pitch-locking position, as shown in FIG. 5B.

More precisely, the notch 200a may be formed by an extrusion in the cam, and the abutment 200b may be formed by the cam and more precisely by the thickness of the cam forming an abutment that prevents the flat 6a of the rod 6 from sliding over its entire length. Preferably, the shoulder of the flat comes mechanically into abutment against the abutment 6a.

FIG. 5B shows the device 18 when the cam 200 has moved in translation into the fan blade pitch-locking position. In this position, the device 18 limits the stroke of the actuator 2 of the blade pitch control system so as to prevent the rods in flight from occupying unauthorized pitch angle positions. The unauthorized pitch angle positions are in particular the thrust reversal position and the other pitch angle positions that give rise to excessive drag.

In other words, in this locking position, when the actuator 2 is actuated, the flats 6a of the rods 6 can slide so as to modify the pitch of the blades along the notches 200a of the cams 200 but over a stroke that is limited compared with the unlocking position of FIG. 5A.

Each cam 200 of the device 18 in the second embodiment of the invention also includes a ramp 200c forming a cam path. The abutment 200b of a cam 200 is interposed between the ramp 200c and the notch 200a.

By way of example, the ramp 200c is in the form of a protuberance projecting from a side face of the cam 200, i.e. in a direction parallel to the direction in which the rod 6 with which the cam 200 is associated itself extends. When the flat 6a of a rod 6 of the actuator 2 slides along the ramp 200c, it occupies a position that prevents any axial movement of the rod 6. This position corresponds advantageously to the feathered position of the fan blades (the blades then have their chords in alignment with the axis of rotation of the propeller).

FIG. 5C thus shows the device 18 when the cam 200 is moved in translation so as to occupy its fan blade feathered position. When the cams 200 are moved in translation into this position, the rods 6 of the actuator 2 are moved in translation axially (the shoulders of their flats 6a come into abutment against the ramps 6c following the cam paths formed by the ramps 6c), thereby moving the blades into the feathered position.

In this feathered position, it should be observed that the contact between the rods and the cams take up the return forces to which the blades are subjected, which leads to excessive stress at those contacts. Thus, one of the ends of the flats in the rods is advantageously shaped to match the shape of the ramp of the ring, so as to increase the area of contact between the flat and the ramp.

The invention claimed is:

1. A device for locking the pitch and for feathering adjustable-pitch fan blades of a turbine engine propeller, the device comprising:
   an actuator having at least one movable portion extending parallel to an axis of rotation of the propeller and designed to be coupled to pivots of the fan blades of the propeller in order to modify their pitch angle when it slides;
   a movable part that is movable relative to the actuator having first mechanical means suitable for co-operating with the actuator when in a fan blade pitch-unlocking position in order to enable the actuator movable portion to slide over an extended actuator stroke; and second mechanical means distinct from the first mechanical means and suitable for co-operating with the actuator when in a fan blade pitch-locking position in order to enable the actuator movable portion to slide over an actuator stroke that is shorter than the extended actuator stroke; and
   drive means for moving the movable part between the unlocking position of the actuator and the locking position of the actuator.

2. The device according to claim 1, wherein the actuator movable portion comprises a flat and the first mechanical means of the movable part include a notch formed in a portion facing the movable portion of the actuator and along which the flat of the movable portion of the actuator can slide when in the fan blade pitch-unlocking position.

3. The device according to claim 1, wherein the movable portion of the actuator comprises a flat and the second mechanical means of the movable part include an abutment against which the flat of the movable portion of the actuator comes into abutment when in the fan blade pitch-locking position.

4. The device according to claim 1, wherein the movable part further comprises third mechanical means distinct from the first and second mechanical means and suitable for co-operating with the actuator to move it into a fan blade feathered position.

5. The device according to claim 4, wherein the movable portion of the actuator comprises a flat and the third mechanical means of the movable part include a ramp projecting from a lateral surface of said movable part and forming a cam path along which the flat of the actuator movable portion slides in order to bring the actuator movable portion into the fan blade feathered position.

6. The device according to claim 1, wherein the movable part comprises a ring centered on the axis of rotation of the propeller, the first mechanical means are configured to co-operate with the actuator in the fan blade pitch-unlocking position to allow the actuator movable portion to slide along an extended actuator stroke, the second mechanical means are angularly offset relative to the first mechanical means and are configured to co-operate with the actuator when in the fan blade pitch-locking position to allow the actuator movable portion to slide over an actuator stroke that is shorter than the extended actuator stroke, and the drive means comprise means for causing the ring to pivot about the axis of rotation of the propeller.

7. The device according to claim 6, wherein the means for causing the ring to pivot about the axis of rotation of the propeller comprise drive means having a gearwheel meshing with teeth carried by the ring.

8. The device according to claim 7, wherein the teeth of the ring are positioned at an outer periphery of the ring and extend angularly over a portion of said ring.

9. The device according to claim 6, wherein the movable portions of the actuator are positioned inside the ring.

10. The device according to claim 1, wherein the extended actuator stroke corresponds substantially to the stroke allowed to the actuator in flight.

11. The device according to claim 1, comprising at least three movable actuator portions regularly distributed around the axis of rotation of the propeller.

12. The system for controlling the pitch of fan blades of a turbine engine having at least one propeller with adjustable pitch fan blades, said propeller being constrained to rotate with a rotary ring, the fan blades being coupled, in order to adjust their pitch, to a system comprising an actuator and a load transfer bearing, the system further comprising a device according to claim 1.

13. The turbine engine comprising at least one set of adjustable pitch fan blades and a fan blade pitch coupling system according to claim 12.

\* \* \* \* \*